United States Patent
Davis (10) Patent No.: US 8,528,061 B1
(45) Date of Patent: Sep. 3, 2013

(54) SECURE SYSTEMS, SOFTWARE, AND METHODS FOR VERIFYING USER-AGENT STRING BY INTERROGATION

(71) Applicant: Quarri Technologies, Inc., Austin, TX (US)

(72) Inventor: Jeffrey Anderson Davis, Austin, TX (US)

(73) Assignee: Quarri Technologies, Inc., Austin, TX (US)

( * ) Notice: Subject to any disclaimer, the term of this patent is extended or adjusted under 35 U.S.C. 154(b) by 0 days.

(21) Appl. No.: 13/711,493

(22) Filed: Dec. 11, 2012

(51) Int. Cl.
*H04L 29/06* (2006.01)

(52) U.S. Cl.
USPC ............... 726/6; 726/1; 726/3; 726/4; 726/5

(58) Field of Classification Search
USPC .......................................................... 726/6
See application file for complete search history.

(56) References Cited

U.S. PATENT DOCUMENTS

| | | | |
|---|---|---|---|
| 7,472,413 B1 | 12/2008 | Mowshowitz | |
| 7,680,755 B2 | 3/2010 | Machani | |
| 7,835,723 B2 | 11/2010 | Bjugan et al. | |
| 8,230,490 B2 | 7/2012 | Zapata et al. | |
| 2009/0222656 A1 | 9/2009 | Rouskov et al. | |
| 2010/0122315 A1* | 5/2010 | Stollman | 726/1 |

\* cited by examiner

*Primary Examiner* — Longbit Chai
(74) *Attorney, Agent, or Firm* — Wilson, Sonsini, Goodrich & Rosati (57) ABSTRACT

Provided are platforms, systems, and software for verifying a user-agent comprising: a software module configured to transmit a quiz to an unverified user-agent, the quiz comprising at least one user-agent verification question drawn from an inventory of user-agent verification questions; a software module configured to receive a response to the quiz, the response comprising a reported user-agent and a result for each question; and a software module configured to compare each result to a result expected from the reported user-agent to verify the reported user-agent. Also provided are methods of using the same.

26 Claims, 2 Drawing Sheets

Fig. 1

SECURE SYSTEMS, SOFTWARE, AND METHODS FOR VERIFYING USER-AGENT STRING BY INTERROGATION

BACKGROUND OF THE INVENTION

Software acting on behalf of a user is often referred to as a user agent. In many cases, a user agent acts as a client in a network protocol used in communications within a client-server distributed computing system. Examples include email applications and web browsing applications. When a software agent operates in a network protocol, it often identifies itself, its application type, operating system, software vendor, or software revision, by submitting a characteristic identification string to its operating peer. In Hypertext Transfer Protocol (HTTP) and with web browsers in particular, this identification is transmitted in a user-agent header field. In such cases, the user-agent string communicated in the user-agent header field identifies the client software originating requests made to the server.

SUMMARY OF THE INVENTION

In web browsing, a user-agent string is often used for content negotiation, where the server selects suitable content or operating parameters for a response to a client request. For example, the user-agent string might be used by a web server to choose between content variants based on the known capabilities of a particular version of client software.

However, a user-agent string reported by a web client is not a definitive or reliable identifier of the client software or its capabilities. Some web clients misreport their identity. Many web browsers include features allowing a user to configure the content of the user-agent string, allowing a user to "spoof" the identity of any software they wish. Even where a web client does not offer user-agent manipulation as a native feature, add-ins, add-ons, extensions, and plug-ins exist to graft this functionality onto many clients. In the case of web browsing, the result is often poorly formatted content or presentation of, for example, a mobile web site to a desktop browser, or vice versa.

In data security applications, however, the stakes are much higher. In some cases, secure web sessions are provided to a set of supported platforms, whereas users with unsupported platforms must be handled differently (e.g., excluded or redirected). Where an unsupported platform optionally reports (e.g., spoofs) the user-agent of a supported platform, software to prevent unauthorized use and replication of confidential data is potentially bypassed or disabled and data security is potentially breached.

Existing systems, applications, and software to determine the identity and capabilities of a web client rely on the user-agent string reported in the user-agent header field (or reported by the JavaScript object "navigator.userAgent"). These traditional systems are ineffective and susceptible to attack regardless of how elaborately the user-agent string is parsed.

The systems, media, software, and methods described herein provide alternatives that cure these deficiencies. Because the systems, media, software, and methods described herein utilize interrogation of the client to functionally verify the reported user-agent, they offer a number of distinct advantages over traditional technologies. Advantages include, but are not limited to, user-agent verification by a dynamic quiz comprising questions drawn from an inventory of questions, functional verification of user-agent based on the actual capabilities of the client, and detection of manipulation through use of cryptographically secured signatures. These advantages result in improved web security capable of defeating sophisticated attacks targeting sensitive data and protection from innocent but careless behavior by authorized users that compromises data.

In one aspect, disclosed herein are non-transitory computer-readable storage media encoded with a computer program including instructions executable by a processor to create a user-agent verification application comprising: a software module configured to transmit a quiz to an unverified user-agent, the quiz comprising at least one user-agent verification question drawn from an inventory of user-agent verification questions; a software module configured to receive a response to the quiz, the response comprising a reported user-agent and a result for each question; and a software module configured to compare each result to a result expected from the reported user-agent to verify the reported user-agent. In some embodiments, the quiz is transmitted in response to a request for user-agent verification. In some embodiments, the inventory, the quiz, or both comprise one or more questions that are JavaScript expressions. In some embodiments, the quiz comprises one or more questions with at least one randomized element. In some embodiments, the quiz comprises a plurality of questions, the order of the questions randomized. In some embodiments, the inventory comprises at least 10, at least 100, at least 200, at least 300, at least 400, at least 500, at least 600, at least 700, at least 800, at least 900, or at least 1000 user-agent verification questions. In some embodiments, the quiz comprises at least 2, at least 5, at least 10, at least 20, at least 30, at least 40, at least 50, at least 60, at least 70, at least 80, at least 90, or at least 100 user-agent verification questions. In some embodiments, the transmitted quiz comprises a cryptographically secured signature. In further embodiments, the cryptographically secured signature is derived from the reported user-agent string, the quiz contents, a timestamp indicating when the quiz was generated, and a private key. In some embodiments, the software module configured to transmit the quiz transmits the quiz over SSL. In some embodiments, the response to the quiz comprises the cryptographically secured signature. In some embodiments, the software module configured to receive a response to the quiz verifies the cryptographically secured signature. In some embodiments, the software module configured to receive a response to the quiz evaluates the response time. In some embodiments, the application is a server application that intercepts incoming HTTP requests.

In another aspect, disclosed herein are non-transitory computer-readable storage media encoded with a computer program including instructions executable by a processor to create a user-agent verification application comprising: an inventory of user-agent verification questions; a software module configured to generate a user-agent verification quiz, the quiz comprising at least one user-agent verification question drawn from the inventory of questions; a software module configured to transmit the quiz to an unverified user-agent, the transmitted quiz comprising a cryptographically secured signature; a software module configured to receive a response to the quiz, the response comprising a reported user-agent, a result for each question, and the cryptographically secured signature; a software module configured to validate the response; a software module configured to compare each result to a result expected from the reported user-agent; and a software module configured to provide a verification token to the user-agent if each result matches the corresponding expected result. In some embodiments, the quiz is generated and transmitted in response to a request for user-agent verification. In some embodiments, the inventory, the quiz, or both comprise one or more questions that are JavaScript expressions. In some embodiments, the quiz comprises one or more questions with at least one randomized element. In some embodiments, the quiz comprises a plurality of questions, the order of the questions randomized. In some embodiments, the inventory comprises at least 10, at least 100, at least 200, at least 300, at least 400, at least 500, at least 600, at least 700, at least 800, at least 900, or at least 1000 user-agent verification questions. In some embodiments, the quiz comprises at least 2, at least 5, at least 10, at least 20, at least 30, at least 40, at least 50, at least 60, at least 70, at least 80, at least 90, or at least 100 user-agent verification questions. In some embodiments, the cryptographically secured signature is derived from the reported user-agent string, the quiz contents, a timestamp indicating when the quiz was generated, and a private key. In some embodiments, the software module configured to transmit the quiz transmits the quiz over SSL. In some embodiments, the software module configured to validate the response to the quiz verifies the cryptographically secured signature. In some embodiments, the software module configured to receive a response to the quiz evaluates the response time. In some embodiments, the application is a server application that intercepts incoming HTTP requests.

In another aspect, disclosed herein are computer-implemented systems comprising: a digital processing device comprising an operating system configured to perform executable instructions and a memory device; a computer program including instructions executable by the digital processing device to create a user-agent verification application, the application comprising: a software module configured to transmit a quiz to an unverified user-agent, the quiz comprising at least one user-agent verification question drawn from an inventory of user-agent verification questions; a software module configured to receive a response to the quiz, the response comprising a reported user-agent and a result for each question; and a software module configured to compare each result to a result expected from the reported user-agent to verify the reported user-agent. In some embodiments, the quiz is transmitted in response to a request for user-agent verification. In some embodiments, the inventory, the quiz, or both comprise one or more questions that are JavaScript expressions. In some embodiments, the quiz comprises one or more questions with at least one randomized element. In some embodiments, the quiz comprises a plurality of questions, the order of the questions randomized. In some embodiments, the inventory comprises at least 10, at least 100, at least 200, at least 300, at least 400, at least 500, at least 600, at least 700, at least 800, at least 900, or at least 1000 user-agent verification questions. In some embodiments, the quiz comprises at least 2, at least 5, at least 10, at least 20, at least 30, at least 40, at least 50, at least 60, at least 70, at least 80, at least 90, or at least 100 user-agent verification questions. In some embodiments, the transmitted quiz comprises a cryptographically secured signature. In further embodiments, the cryptographically secured signature is derived from the reported user-agent string, the quiz contents, a timestamp indicating when the quiz was generated, and a private key. In some embodiments, the software module configured to transmit the quiz transmits the quiz over SSL. In some embodiments, the response to the quiz comprises the cryptographically secured signature. In some embodiments, the software module configured to receive a response to the quiz verifies the cryptographically secured signature. In some embodiments, the software module configured to receive a response to the quiz evaluates the response time. In some embodiments, the application is a server application that intercepts incoming HTTP requests.

In another aspect, disclosed herein are computer-implemented methods comprising the steps of: generating, by a computer, a user-agent verification quiz, the quiz comprising at least one user-agent verification question drawn from an inventory of user-agent verification questions; transmitting, by the computer, the quiz to an unverified user-agent, the transmitted quiz comprising a cryptographically secured signature; receiving, at the computer, a response to the quiz, the response comprising a reported user-agent, a result for each question, and the cryptographically secured signature; validating, by the computer, the response to the quiz utilizing the cryptographically secured signature; and comparing, by the computer, each result to a result expected from the reported user-agent to verify the reported user-agent. In some embodiments, the inventory, the quiz, or both comprise one or more questions that are JavaScript expressions. In some embodiments, the quiz comprises one or more questions with at least one randomized element. In some embodiments, the quiz comprises a plurality of questions, the order of the questions randomized. In some embodiments, the inventory comprises at least 10, at least 100, at least 200, at least 300, at least 400, at least 500, at least 600, at least 700, at least 800, at least 900, or at least 1000 user-agent verification questions. In some embodiments, the quiz comprises at least 2, at least 5, at least 10, at least 20, at least 30, at least 40, at least 50, at least 60, at least 70, at least 80, at least 90, or at least 100 user-agent verification questions. In some embodiments, the quiz is generated in response to a request for user-agent verification. In some embodiments, the cryptographically secured signature is derived from the reported user-agent string, the quiz contents, a timestamp indicating when the quiz was generated, and a private key.

DETAILED DESCRIPTION OF THE INVENTION

Existing technologies for user-agent identification are susceptible to spoofing and manipulation by hackers as well as innocent, but careless behavior of authorized users. These traditional technologies rely upon parsing the user-agent string instead of verifying the string as reported by the client.

Described herein, in certain embodiments, are non-transitory computer-readable storage media encoded with a computer program including instructions executable by a processor to create a user-agent verification application comprising: a software module configured to transmit a quiz to an unverified user-agent, the quiz comprising at least one user-agent verification question drawn from an inventory of user-agent verification questions; a software module configured to receive a response to the quiz, the response comprising a reported user-agent and a result for each question; and a software module configured to compare each result to a result expected from the reported user-agent to verify the reported user-agent.

Also described herein, in certain embodiments, are non-transitory computer-readable storage media encoded with a computer program including instructions executable by a processor to create a user-agent verification application comprising: an inventory of user-agent verification questions; a software module configured to generate a user-agent verification quiz, the quiz comprising at least one user-agent verification question drawn from the inventory of questions; a software module configured to transmit the quiz to an unverified user-agent, the transmitted quiz comprising a cryptographically secured signature; a software module configured to receive a response to the quiz, the response comprising a reported user-agent, a result for each question, and the cryptographically secured signature; a software module configured to validate the response; a software module configured to compare each result to a result expected from the reported user-agent; and a software module configured to provide a verification token to the user-agent if each result matches the corresponding expected result.

Also described herein, in certain embodiments, are computer-implemented systems comprising: a digital processing device comprising an operating system configured to perform executable instructions and a memory device; a computer program including instructions executable by the digital processing device to create a user-agent verification application, the application comprising: a software module configured to transmit a quiz to an unverified user-agent, the quiz comprising at least one user-agent verification question drawn from an inventory of user-agent verification questions; a software module configured to receive a response to the quiz, the response comprising a reported user-agent and a result for each question; and a software module configured to compare each result to a result expected from the reported user-agent to verify the reported user-agent.

Also described herein, in certain embodiments, are computer-implemented methods comprising the steps of: generating, by a computer, a user-agent verification quiz, the quiz comprising at least one user-agent verification question drawn from an inventory of user-agent verification questions; transmitting, by the computer, the quiz to an unverified user-agent, the transmitted quiz comprising a cryptographically secured signature; receiving, at the computer, a response to the quiz, the response comprising a reported user-agent, a result for each question, and the cryptographically secured signature; validating, by the computer, the response to the quiz utilizing the cryptographically secured signature; and comparing, by the computer, each result to a result expected from the reported user-agent to verify the reported user-agent.

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Overview

In some embodiments, the systems, media, software, and methods described herein provide verification of a user-agent in the context of a web-based security infrastructure. In further embodiments, a user-agent is verified to ensure that a user requesting secured information is making the request via a platform configured in a way that supports the operation of all of the features of the security infrastructure. Even where a user-agent string is intentionally altered or spoofed, a web-based security application must detect and redirect users whose web-client is not supported.

Figure 1:
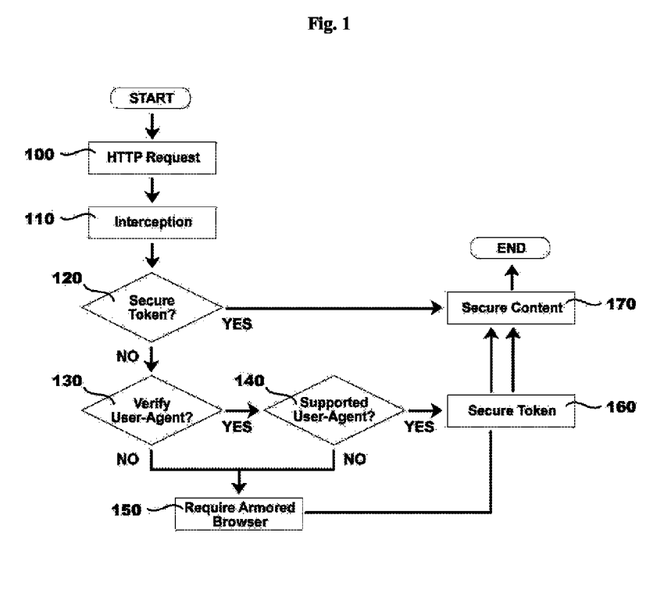
FIG. 1 shows a non-limiting example of a contextual overview process flow; in this case, a process flow demonstrating the role of user-agent verification in a web-based security infrastructure.

Referring to FIG. 1, by way of non-limiting example, in a particular embodiment, a user makes a HTTP request for access to secure web content 100. The user's HTTP request is intercepted by a server application running on the web server 110. The HTTP request from the requesting user-agent is examined for presence of a cryptographically secured token 120, which would indicate previous user-agent verification. If the user-agent is associated with a previously issued cryptographically secured token, the request for access to the secure web content is granted 170. However, if the user-agent is not associated with a cryptographically secured token, the system attempts to verify the user-agent by interrogation 130. If the user-agent is verified, the system next determines if the user-agent configuration is a supported configuration 140. Supported user-agents are provided with a cryptographically secured token 160 and redirected to the requested secure web content 170. Unsupported user-agents are directed to employ a web-based armored browser supplied by the security infrastructure 150. A user employing the armored browser is further redirected to the requested secure web content 170.

In some embodiments, the systems, media, software, and methods described herein provide verification of a user-agent utilizing one or more of: a software module configured to generate a user-agent verification quiz by drawing at least one user-agent verification question from an inventory of questions; a software module configured to transmit the generated quiz to an unverified user-agent along with a cryptographically secured signature that includes the quiz content, a timestamp indicating the date and time the quiz was generated, and a private key; a software module configured to receive a response to the quiz, the response comprising a reported user-agent, a result for each question, and the cryptographically secured signature; a software module configured to validate the response by utilizing the private key to examine the cryptographically secured signature and evaluating the quiz content and the timestamp; a software module configured to compare each result to a result expected from the reported user-agent; and a software module configured to provide a cryptographically secured token to the user-agent if each result matches the corresponding expected result.

Figure 2:
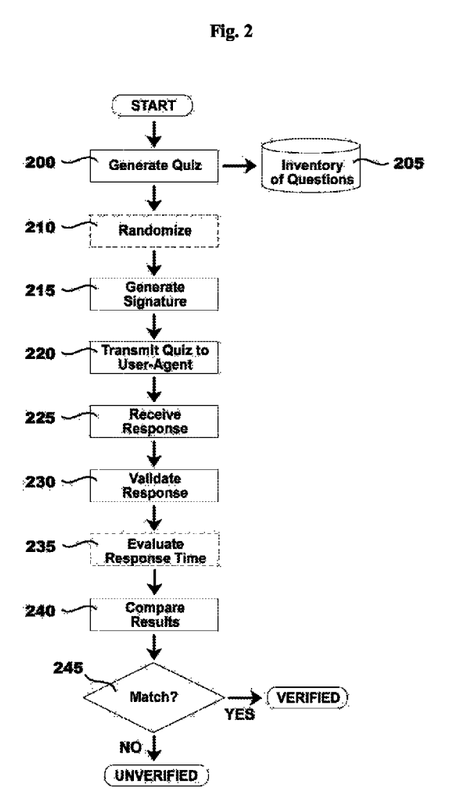
FIG. 2 shows a non-limiting example of a user-agent verification process flow; in this case, a process flow demonstrating use of a dynamically generated user-agent verification quiz, the authenticity and integrity of which is secured by a digital signature.

Referring to FIG. 2, by way of non-limiting example, in a particular embodiment, the systems, media, software, and methods described herein, in response to an intercepted HTTP request for secure web content, generate a user-agent verification quiz 200 by drawing at least one user-agent verification question from an inventory of questions 205. Optionally, the quiz contains a plurality of questions, the sequence of which is randomized 210. A cryptographically secured signature is generated based on the content of the generated quiz, a timestamp indicating the date and time of the quiz's creation, and a private key on the server 215. Next, the quiz along with the cryptographically secured signature are transmitted (optionally over HTTPS) to the unverified user-agent 220. The questions of the quiz are evaluated at the user-agent to generate a response to each question. These results, along with the original quiz (including the cryptographically secured signature) and the reported user-agent string, are sent to the server. The response is received at the server 225. This response is validated at the server by utilizing the cryptographically secured signature to verify that the questions were generated by the server and not altered in any way 230. Validation also, optionally, includes evaluation of the response time by utilizing the timestamp included in the cryptographically secured signature 235. The resulting answer to each question asked is compared to an expected answer based on the reported user-agent string 240. If each answer matches 245 the answer expected from the reported user-agent, the user-agent is verified. If any answer does not match 245 the answer expected from the reported user-agent, the user-agent is unverified. In this embodiment, once a user-agent is verified it can be further determined if the user-agent is supported or unsupported.

User-Agent Verification Questions

In some embodiments, the systems, media, software, and methods described herein include one or more user-agent verification questions, or use of the same. In some embodiments, a user-agent verification question is a scripting or programming expression. In further embodiments, a user-agent verification question resolves, or fails to resolve, to a particular answer (e.g., result) based on the capabilities and/or characteristics of a particular user platform, operating system, web client, and client plug-in/extension configuration, including versions and revisions thereof. In some embodiments, a user-agent verification question is associated with an expected answer (e.g., result) for each known or predicted user-agent.

In some embodiments, a user-agent verification question is a scripting or programming expression written entirely in code executable within the web client application. In further embodiments, a user-agent verification question accesses application programming interfaces (APIs) offered by a web client and/or plug-ins/extensions thereof. In still further embodiments, a user-agent verification question is a JavaScript expression. In one particular non-limiting example, a user-agent verification question is the JavaScript expression "1985614482% 19325," which those of ordinary skill in the art will interpret as "find the value of 1985614482 mod 19325."

In some embodiments, a user-agent verification question is fixed and the expression completely determined. In other embodiments, a user-agent verification question includes one or more randomized elements. In various embodiments, a user-agent verification question includes about 1, 2, 3, 4, 5, 6, 7, 8, 9, 10, 11, 12, 13, 14, 15, 16, 17, 18, 19, 20, 30, 40, 50, 60, 70, 80, 90, 100 or more randomized elements, including increments therein. In certain embodiments, a user-agent verification question includes about 1 to about 5, about 5 to about 10, about 10 to about 15, about 15 to about 20, or about 20 to about 25 randomized elements. In some embodiments, a user-agent verification question includes 1 randomized element. In a particular non-limiting embodiment, a randomized element is a randomly generated number, string, or alphanumeric of any suitable length. In a further particular non-limiting example, a user-agent verification question is "1985614482% 19325," wherein both of the numeric elements are randomly generated numbers. In some embodiments, variable elements in user-agent verification questions allow the systems, media, software, and methods described herein to generate and utilize a vast array of non-repeating user-agent verification questions and quizzes.

In some embodiments, one or more user-agent verification questions are written by one or more humans. In some embodiments, one or more user-agent verification questions are computer-generated. In some embodiments, a user-agent verification question is written in part by a human and in part by a computer.

In some embodiments, the systems, media, software, and methods described herein include an inventory of user-agent verification questions, or use of the same. In further embodiments, an inventory of user-agent verification questions is, for example, a list, collection, pool, or database of user-agent verification questions. In some embodiments, an inventory of user-agent verification questions is stored in a flat file. In various embodiments, suitable flat files include, by way of non-limiting examples, character delimited flat files (e.g., CSV, tab delimited, etc.), fixed length flat files (e.g., COBOL), binary flat files, and proprietary ASCII flat files (e.g., DBF). In some embodiments, an inventory of user-agent verification questions is stored in a database. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

An inventory of user-agent verification questions is any suitable size. In various embodiments, an inventory of user-agent verification questions suitably includes at least 2, 3, 4, 5, 6, 7, 8, 9, 10, 20, 30, 40, 50, 60, 70, 80, 90, 100, 200, 300, 400, 500, 600, 700, 800, 900, or 1000 user-agent verification questions, including increments therein. In other various embodiments, an inventory of user-agent verification questions suitably includes at least 1000, 2000, 3000, 4000, 5000, 6000, 7000, 8000, 9000, or 10000 user-agent verification questions, including increments therein. In some embodiments, an inventory of user-agent verification questions suitably includes about 2 to about 10, about 10 to about 100, about 100 to about 1000, about 1000 to about 10000, or about 10000 to about 100000 user-agent verification questions. In some embodiments, an inventory of user-agent verification questions suitably includes about 2, 3, 4, 5, 6, 7, 8, 9, 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, 20000, 30000, 40000, 50000, 60000, 70000, 80000, 90000, or 100000 user-agent verification questions, including increments therein.

User-Agent Verification Quiz

In some embodiments, the systems, media, software, and methods described herein include a list of user-agent verification questions (e.g., a user-agent verification quiz), or use of the same. In some embodiments, a user-agent verification quiz includes at least one user-agent verification question. In some embodiments, a user-agent verification quiz includes user-agent verification questions drawn from an inventory of user-agent verification questions described herein.

A user-agent verification quiz described herein has a wide range of suitable numbers of questions. In some embodiments, a user-agent verification quiz includes one user-agent verification question. In various embodiments, a user-agent verification quiz suitably includes about 2, 3, 4, 5, 6, 7, 8, 9, 10, 11, 12, 13, 14, 15, 16, 17, 18, 19, 20 or more user-agent verification questions. In other various embodiments, a user-agent verification quiz suitably includes about 20, 30, 40, 50, 60, 70, 80, 90, 100 or more user-agent verification questions, including increments therein. In other various embodiments, a user-agent verification quiz suitably includes about 100, 200, 300, 400, 500, 600, 700, 800, 900, 1000 or more user-agent verification questions, including increments therein. In other embodiments, a user-agent verification quiz includes one user-agent verification question. In some embodiments, a user-agent verification quiz suitably includes about 2 to about 5, about 5 to about 10, about 10 to about 15, about 15 to about 20, about 20 to about 30, about 30 to about 40, about 40 to about 50, about 50 to about 60, about 60 to about 70, about 70 to about 80, about 80 to about 90, or about 90 to about 100 user-agent verification questions. In some embodiments, a user-agent verification quiz suitably includes at least 2, at least 5, at least 10, at least 15, at least 20, at least 30, at least 40, at least 50, at least 60, at least 70, at least 80, at least 90, or at least 100 user-agent verification questions. In some embodiments, a suitable number of user-agent verification questions in a user-agent verification quiz is determined by one or more of: client processing time required to answer the questions, client processing power required to answer the questions, degree of confidence in the claimed user-agent's veracity based on the user-agent's responses to one or more prior quizzes, the number of questions required to sufficiently resolve the client platform, operating system, web client software, and plug-ins/extensions, including versions and revisions thereof.

In some embodiments, a user-agent verification quiz includes a pre-determined number of user-agent verification questions. In some embodiments, a user-agent verification quiz includes a variable number of user-agent verification questions. In some embodiments, a user-agent verification quiz includes a dynamically determined number of user-agent verification questions. In some embodiments, a user-agent verification quiz includes a number of user-agent verification questions randomly determined from within a suitable range of values. In some embodiments, variable numbers of user-agent verification questions allow the systems, media, software, and methods described herein to generate and utilize a vast array of non-repeating user-agent verification quizzes.

In some embodiments, a user-agent verification quiz includes a plurality of user-agent verification questions and the order of the questions within the quiz is pre-determined. In some embodiments, a user-agent verification quiz includes a plurality of user-agent verification questions and the order of the questions within the quiz is dynamically determined. In some embodiments, a user-agent verification quiz includes a plurality of user-agent verification questions and the order of the questions within the quiz is randomized. In some embodiments, randomization of question order allows the systems, media, software, and methods described herein to generate and utilize a vast array of non-repeating user-agent verification quizzes.

In some embodiments, the systems, media, software, and methods described herein utilize one user-agent verification quiz to verify a reported user-agent string. In other embodiments, the systems, media, software, and methods described herein utilize a plurality of user-agent verification quizzes to verify a reported user-agent string. In various embodiments, the systems, media, software, and methods described herein utilize 2, 3, 4, 5, 6, 7, 8, 9, 10 or more user-agent verification quizzes to verify a reported user-agent string. In further embodiments, a plurality of user-agent verification quizzes are sent to a client in parallel (e.g., simultaneously). In other embodiments, a plurality of user-agent verification quizzes are sent to a client in series. In further embodiments, answers to the questions of a previous quiz is utilized to determine the content of a subsequently quiz. In some embodiments, the systems, media, software, and methods described herein employ a series of quizzes, the content of which is refined in each quiz-response cycle, until a reported user-agent is sufficiently verified.

In some embodiments, the systems, media, software, and methods described herein utilize a user-agent verification quiz to verify a reported user-agent string. In further embodiments, validation includes comparing the results of expressions evaluated at the user-agent to results expected based on the user-agent string reported by the client. In some embodiments, verification of a reported user-agent is based on the degree to which actual answers to quiz questions match expected answers. Many degrees of matching are suitable for verification of a reported user agent. In some embodiments, 100 percent match is required for verification of a reported user agent. In other embodiments, at least 99, 98, 97, 96, 95, 94, 93, 92, 91, 90, 89, 88, 87, 86, 85, 84, 83, 82, 81, 80, 79, 78, 77, 76, 75, 74, 73, 72, 71, 70, 69, 68, 67, 66, 65, 64, 63, 62, 61, 60, 59, 58, 57, 56, 55, 54, 53, 52, 51, or 50 percent match is required for verification of a reported user agent. In some embodiments, about 100 to about 90 percent match, about 90 to about 80 percent match, about 80 to about 70 percent match, about 70 to about 60 percent match, or about 60 to about 50 percent match is required for verification of a reported user agent. In some embodiments, the percent match is variable based on, for example, the reported user-agent, IP address, and the like.

In some embodiments, the systems, media, software, and methods described herein validate a response to a user-agent verification quiz. In further embodiments, validation or a response to a user-agent verification quiz includes evaluating a cryptographically secured signature, described further herein, and associated with the response. In still further embodiments, evaluation of the cryptographically secured signature validates the response by determining the origin of the quiz and the quiz questions (e.g., authenticity), determining if the quiz or the quiz questions were altered (e.g., integrity), and determining the time between generation of the quiz and the receipt of the response.

In some embodiments, validation or a response to a user-agent verification quiz includes evaluating response time by comparing a timestamp indicating the date and time the quiz was generated with a timestamp associated with the response. In some embodiments, a response time longer than a threshold response time indicates a potential for forgery or manipulation of the user-agent verification process and invalidates the response. Many threshold response times are suitably determined. In various embodiments, suitable response times include, by way of non-limiting examples, less than 120 seconds, less than 90 seconds, less than 60 seconds, less than 30 seconds, less than 20 seconds, less than 10 seconds, less than 9 seconds, less than 8 seconds, less than 7 seconds, less than 6 seconds, less than 5 seconds, less than 4 seconds, less than 3 seconds, less than 2 seconds, or less than 1 second, including increments therein. In various further embodiments, suitable response times include, by way of non-limiting examples, less than 1000 milliseconds, less than 900 milliseconds, less than 800 milliseconds, less than 700 milliseconds, less than 600 milliseconds, less than 500 milliseconds, less than 400 milliseconds, less than 300 milliseconds, less than 200 milliseconds, or less than 100 milliseconds, including increments therein.

Cryptographically Secured Signature

In some embodiments, the systems, media, software, and methods described herein utilize one or more cryptographically secured signatures (also known as digital signatures or secure cryptographic signatures), or use of the same. A cryptographically secured signature is a mathematical scheme that employs cryptography for demonstrating the authenticity of a digital message or document. A cryptographically secured signature may include anything susceptible to representation as a bitstring, including, for example, a user-agent verification quiz, a response to a user-agent verification quiz, a reported user-agent string, and a date and/or timestamp.

In some embodiments, a valid cryptographically secured signature provides the systems, media, software, and methods described herein with evidence of a digital transmission's authenticity and integrity. In further embodiments, authenticity refers to confidence in the source of a digital transmission. For example, when ownership of a digital signature secret key is bound to a specific user, a valid signature shows that the message was sent by that user. In further embodiments, integrity refers to confidence that a message or document has not been altered during transmission.

In some embodiments, a cryptographically secured signature is included with quiz that is transmitted to an unverified user-agent. In further embodiments, a cryptographically secured signature included with a quiz is later returned with a response to the quiz in order to verify the authenticity and integrity of the questions. In still further embodiments, a cryptographically secured signature included with quiz comprises a checksum of one or more of: the reported user-agent string, the quiz (including the questions), a timestamp indicating when the quiz was generated, and a private key. In some embodiments, a cryptographically secured signature included with quiz comprises a checksum of the quiz (including the questions), a timestamp indicating when the quiz was generated, and a private key.

In some embodiments, the cryptographically secured signature is included with the response to the quiz that is transmitted from an unverified user-agent. In further embodiments, a cryptographically secured signature is included with a response in order to validate the questions asked in the quiz and how long ago the quiz was generated.

In some embodiments, the systems, media, software, and methods described herein utilize cryptographic protocols such as, by way of non-limiting examples, Transport Layer Security (TLS) and Secure Sockets Layer (SSL) to provide communication security when transmitting and receiving information (e.g., quizzes, responses, signatures, user-agents, secured tokens, etc.) over the Internet. TLS and SSL encrypt the segments of network connections using asymmetric cryptography for key exchange, symmetric encryption for confidentiality, and message authentication codes for message integrity.

Cryptographically Secured Token

In some embodiments, the systems, media, software, and methods described herein include a software module to provide a token to a user-agent upon successful completion of the verification process, or use of the same. In further embodiments, a token provides an indication that a particular user-agent is verified. In some embodiments, the systems, media, software, and methods described herein include a cryptographically secured token, or use of the same. In further embodiments, a cryptographically secured token provides an indication that a particular user-agent is verified. In still further embodiments, a cryptographically secured token provides an indication that a particular user-agent is verified as a configuration supported by a web-based security infrastructure. In some embodiments, a cryptographically secured signature is utilized to generate a cryptographically secured token in order to provide authenticity and integrity to the indication that a particular user-agent is verified.

In some embodiments, a cryptographically secured token includes the reported (and verified) user-agent string in the cryptographically secured token. In further embodiments, a cryptographically secured token includes the reported (and verified) user-agent string for use in comparisons with subsequently reported user-agent strings from the same client.

Any suitable token is optionally associated with a particular user-agent upon verification that the configuration is supported. In some embodiments, a suitable token is a cookie (also known as a HTTP cookie, web cookie, or browser cookie). In further embodiments, a suitable token is a session cookie (e.g., a transient cookie) that exists in temporary memory. In still further embodiments, a web client deletes the session cookie when the user closes the browser, requiring re-verification of the user-agent as described herein. In some embodiments, a suitable token is a secure cookie with the secure attribute enabled and transmitted by via HTTPS, ensuring that the cookie is encrypted when transmitting from client to server. In further embodiments, a token, is cryptographically secured to prevent forgery or alteration of the token.

Digital Processing Device

In some embodiments, the systems, media, software, and methods described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Storage Medium

In some embodiments, the systems, media, software, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the systems, media, software, and methods disclosed herein include at least one computer program, or use of the same. A computer program includes a sequence of instructions, executable in the digital processing device's CPU, written to perform a specified task. In light of the disclosure provided herein, those of skill in the art will recognize that a computer program may be written in various versions of various languages. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the systems, media, software, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the systems, media, software, and methods disclosed herein include one or more databases, or use of the same. In view of the disclosure provided herein, those of skill in the art will recognize that many databases are suitable for storage and retrieval of user-agent information, user-agent verification questions (including expected and actual results), user-agent verification quiz information, and the like. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1

Successful User-Agent Verification

A corporate intranet user wishes to remotely access secure company documents via a secure web-portal. The user opens a web browser on their company issued PC running Microsoft® Windows 8. The web browser is Microsoft® Internet Explorer®. The user's initial HTTP request for secure web content is intercepted at the web server by a server application for verifying user-agents. The application provides a JavaScript file to the unverified user-agent. The JavaScript file requests a user-agent verification quiz from the server application. The application randomly selects 10 JavaScript expressions from database of 1000 such expressions that are written to detect differences in various user-agent configurations, such as platform, operating system, web-client, plug-ins, extensions, including versions of and revisions thereto. The expressions are packaged into a quiz in random order and provided to the user-agent. The expressions are received by the user-agent and evaluated according to the user-agent's capabilities and functionality to produce a result for each expression. The results are sent back to the server application in the form of a response to the user-agent verification quiz along with the user-agent string reported by the user-agent. The response is received by the server application. The result associated with each expression is compared to a result expected from a user-agent of the configuration reported. Each of the results matches the expected result and the user-agent reported is deemed verified. The verified user-agent is provided with a secure token to indicate its verified status and the user is redirected to the content originally requested. The described process takes less than 500 milliseconds.

Example 2

Failed User-Agent Verification

A corporate intranet user wishes to remotely access secure company documents via a secure web-portal. The user opens a web browser on their personal laptop running Apple® Mac OS X®. The web browser is Apple® Safari®. The user's initial HTTP request for secure web content is intercepted at the web server by a server application for verifying user-agents. The application provides a JavaScript file to the unverified user-agent. The JavaScript file requests a user-agent verification quiz from the server application. The application randomly selects 3 JavaScript expressions from database of 100 such expressions that are written to detect differences in various user-agent configurations, such as platform, operating system, web-client, plug-ins, extensions, including versions of and revisions thereto. One of the expressions includes a placeholder for a randomly generated number, which is produced and added to this expression. The expressions are packaged into a quiz in random order and provided to the user-agent. A cryptographically secured signature is also generated by producing a checksum of the quiz contents, a timestamp indicating quiz creation date and time, and private key stored on the server. The cryptographically secured signature is associated with the quiz and delivered to the unverified user-agent. The quiz and the cryptographically secured signature are received by the user-agent and evaluated according to the user-agent's capabilities and functionality to produce a result for each expression. The results are sent back to the server application in the form of a response to the user-agent verification quiz along with the user-agent string reported by the user-agent and the original quiz provided (including the associated cryptographically secured signature). The response is received by the server application and validated by evaluating the signature and the timestamp therein. The response was returned within a threshold time limit of 1000 milliseconds and is determined to be valid. The result associated with each expression is compared to a result expected from a user-agent of the configuration reported. Two of the three results do not match the expected result and the user-agent reported is deemed unverified. The user is redirected to a location where they optionally install and run an armored web browser provided by the security infrastructure.

Example 3

Detecting a Spoofed User-Agent String

A hacking user attempts to illicitly access confidential documents on a secure government web-portal. The user attempts to request access to the portal using the Maxthon web browser on her PC, which she had chosen for its lack of specific support within common security infrastructures. However, the user configures her web browser to report a user-agent string indicating Microsoft® Internet Explorer 8®, which is widely supported. The user's initial HTTP request for the secure web content is intercepted at the web server by a server application for verifying user-agents. The application provides a JavaScript file to her unverified user-agent. The JavaScript file requests a user-agent verification quiz from the server application. The application randomly selects 10 JavaScript expressions from database of 500 such expressions that are written to detect differences in various user-agent configurations, such as platform, operating system, web-client, plug-ins, extensions, including versions of and revisions thereto. The expressions are packaged into a quiz and provided to the user-agent. A cryptographically secured signature is also generated by producing a checksum of the reported user-agent string, the quiz contents, a timestamp indicating quiz creation date and time, and private key stored on the server. The cryptographically secured signature is associated with the quiz and delivered to the unverified user-agent. The quiz and the cryptographically secured signature are received by the user-agent and evaluated according to the user-agent's actual capabilities and functionality to produce a result for each expression. The results are sent back to the server application in the form of a response to the user-agent verification quiz along with the user-agent string reported by the user-agent and the original quiz provided (including the associated cryptographically secured signature). The response is received by the server application and validated by evaluating the signature and the timestamp therein. The response was returned within an acceptable threshold time limit of 500 milliseconds. The result associated with each expression is compared to a result expected from a user-agent of the configuration reported. None of the results match the expected result. The server application for verifying user-agents repeats the process with 10 newly selected JavaScript expressions, generating and transmitting a second user-agent verification quiz. Once again, none of the results match the expected result and the user-agent reported is deemed unverified. The user is redirected and her IP address blocked.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention claimed is:

1. A non-transitory computer-readable storage media encoded with a computer program including instructions executable by a processor to create an application for verifying a user-agent string comprising:
 a. a software module configured to transmit a quiz to an unverified user-agent, the quiz comprising at least one user-agent verification question drawn from an inventory of user-agent verification questions and a cryptographically secured signature;
 b. a software module configured to receive a response to the quiz, the response comprising a reported user-agent string, the cryptographically secured signature, and a result for each question, wherein the user-agent string, which does not include any personally identifiable information, is reported by the user-agent to publicly characterize said user-agent; and
 c. a software module configured to compare each result to a result expected from the reported user-agent string to verify the fidelity of the reported user-agent string.

2. The storage media of claim 1, wherein the inventory, the quiz, or both comprise one or more questions that are JavaScript expressions.

3. The storage media of claim 1, wherein the quiz comprises one or more questions with at least one randomized element.

4. The storage media of claim 1, wherein the quiz comprises a plurality of questions, the order of the questions randomized.

5. The storage media of claim 1, wherein the inventory comprises at least 10, at least 100, at least 200, at least 300, at least 400, at least 500, at least 600, at least 700, at least 800, at least 900, or at least 1000 user-agent verification questions.

6. The storage media of claim 1, wherein the quiz comprises at least 2, at least 5, at least 10, at least 20, at least 30, at least 40, at least 50, at least 60, at least 70, at least 80, at least 90, or at least 100 user-agent verification questions.

7. The storage media of claim 1, wherein the cryptographically secured signature is derived from the reported user-agent string, the quiz contents, a timestamp indicating when the quiz was generated, and a private key.

8. The storage media of claim 1, wherein the software module configured to transmit the quiz transmits the quiz over SSL.

9. The storage media of claim 1, wherein the software module configured to receive a response to the quiz verifies the cryptographically secured signature.

10. The storage media of claim 1, wherein the software module configured to receive a response to the quiz evaluates the response time.

11. The storage media of claim 1, wherein the application is a server application that intercepts incoming HTTP requests.

12. A non-transitory computer-readable storage media encoded with a computer program including instructions executable by a processor to create an application for verifying a user-agent string, the application comprising:
 a. an inventory of user-agent verification questions;
 b. a software module configured to generate a user-agent verification quiz, the quiz comprising at least one user-agent verification question drawn from the inventory of questions;
 c. a software module configured to transmit the quiz to an unverified user-agent, the transmitted quiz comprising a cryptographically secured signature;
 d. a software module configured to receive a response to the quiz, the response comprising a reported user-agent string, wherein the user-agent string, which does not include any personally identifiable information, is reported by the user-agent to publicly characterize said user-agent, a result for each question, and the cryptographically secured signature;
 e. a software module configured to validate the response;
 f. a software module configured to compare each result to a result expected from the reported user-agent string; and
 g. a software module configured to provide a verification token to the user-agent if each result matches the corresponding expected result.

13. A computer-implemented system comprising:
 a. a digital processing device comprising an operating system configured to perform executable instructions and a memory device;
 b. a computer program including instructions executable by the digital processing device to create an application for verifying a user-agent string, the application comprising:
  i. a software module configured to transmit a quiz to an unverified user-agent, the quiz comprising at least one user-agent verification question drawn from an inventory of user-agent verification questions and a cryptographically secured signature;
  ii. a software module configured to receive a response to the quiz, the response comprising a reported user-agent string, wherein the user-agent string, which does not include any personally identifiable information, is reported by the user-agent to publicly characterize said user-agent, a result for each question, and the cryptographically secured signature; and
  iii. a software module configured to compare each result to a result expected from the reported user-agent string to verify the fidelity of the reported user-agent string.

14. The system of claim 13, wherein the inventory, the quiz, or both comprise one or more questions that are JavaScript expressions.

15. The system of claim 13, wherein the quiz comprises one or more questions with at least one randomized element.

16. The system of claim 13, wherein the quiz comprises a plurality of questions, the order of the questions randomized.

17. The system of claim 13, wherein the inventory comprises at least 10, at least 100, at least 200, at least 300, at least 400, at least 500, at least 600, at least 700, at least 800, at least 900, or at least 1000 user-agent verification questions.

18. The system of claim 13, wherein the quiz comprises at least 2, at least 5, at least 10, at least 20, at least 30, at least 40, at least 50, at least 60, at least 70, at least 80, at least 90, or at least 100 user-agent verification questions.

19. The system of claim 13, wherein the cryptographically secured signature is derived from the quiz contents, a timestamp indicating when the quiz was generated, and a private key.

20. The system of claim 13, wherein the software module configured to transmit the quiz transmits the quiz over SSL.

21. The system of claim 13, wherein the software module configured to receive a response to the quiz verifies the cryptographically secured signature.

22. The system of claim 13, wherein the software module configured to receive a response to the quiz evaluates the response time.

23. The system of claim 13, wherein the application is a server application that intercepts incoming HTTP requests.

24. A computer-implemented method for verifying a user-agent string comprising the steps of:
 a. generating, by a computer, a user-agent verification quiz, the quiz comprising at least one user-agent verification question drawn from an inventory of user-agent verification questions;
 b. transmitting, by the computer, the quiz to an unverified user-agent, the transmitted quiz comprising a cryptographically secured signature;
 c. receiving, at the computer, a response to the quiz, the response comprising a reported user-agent string, wherein the user-agent string, which does not include any personally identifiable information, is reported by the user-agent to publicly characterize said user-agent, a result for each question, and the cryptographically secured signature;
 d. validating, by the computer, the response to the quiz utilizing the cryptographically secured signature; and
 e. comparing, by the computer, each result to a result expected from the reported user-agent string to verify the fidelity of the reported user-agent string.

25. The method of claim 24, wherein the quiz is generated in response to a request for user-agent verification.

26. The method of claim 24, wherein the cryptographically secured signature is derived from the reported user-agent string, the quiz contents, a timestamp indicating when the quiz was generated, and a private key.

* * * * *